H. H. MYERS.
GAS COCK AND FAUCET PROTECTOR.
APPLICATION FILED NOV. 30, 1917.
1,380,675. Patented June 7, 1921.
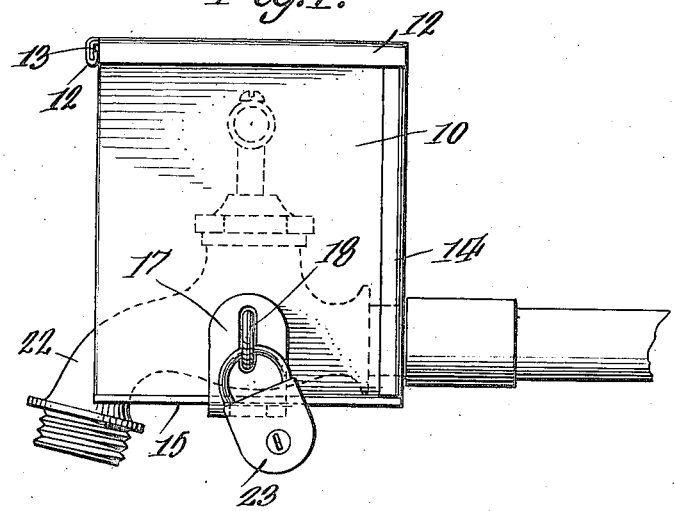
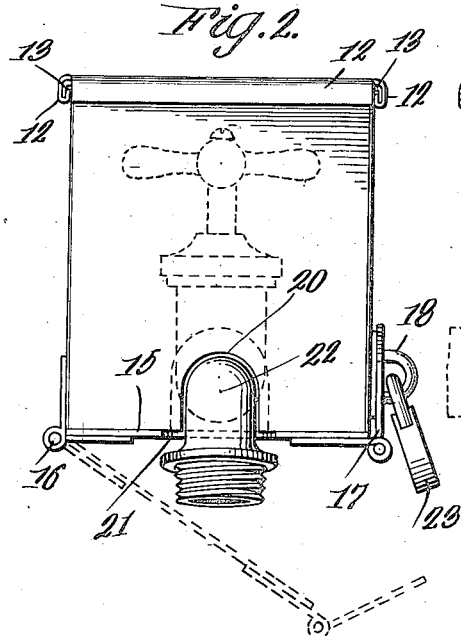
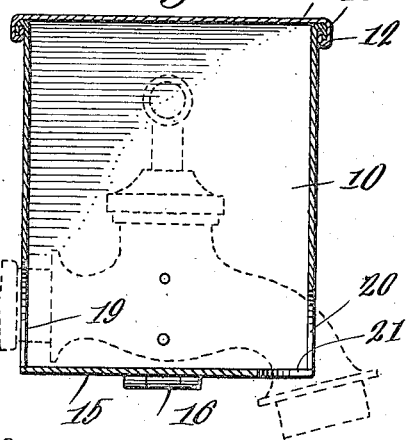
INVENTOR
Harry H. Myers

UNITED STATES PATENT OFFICE.

HARRY H. MYERS, OF BESSEMER, ALABAMA.

GAS-COCK AND FAUCET PROTECTOR.

1,380,675.          Specification of Letters Patent.     Patented June 7, 1921.

Application filed November 30, 1917. Serial No. 204,754.

*To all whom it may concern:*

Be it known that I, HARRY H. MYERS, a citizen of the United States, residing at Bessemer, in the county of Jefferson and State of Alabama, have invented certain new and useful Improvements in Gas-Cock and Faucet Protectors, of which the following is a specification.

This invention relates to an improved guard for use in connection with a faucet such as used upon a water pipe or in connection with a cock such as used upon a gas pipe. The principal object of the invention is to so construct the guard that it may be put in place and secured against removal by unauthorized persons thus preventing the valve being opened when not so desired.

Another object of the invention is to so construct this guard that it may be used in connection with a cock or faucet of a conventional construction and to further so construct the guard that it may be formed of sheet metal or cast metal thus permitting it to have a light but strong construction.

This invention is illustrated in the accompanying drawings, wherein:—

Figure 1 is a side elevation showing the improved guard connected with a faucet, Fig. 2 is an end elevation of the guard and faucet shown in Fig. 1, Fig. 3 is a vertical sectional view through the guard.

The guard shown in Figs. 1, 2 and 3 will be formed of sheet metal and comprises a housing 10 having a cover 11 provided with depending flanges 12 crimped to engage the flanges 13 at the upper ends of the walls of the housing, thus securely connecting the cover with the housing. The strip from which the housing is formed will have its end portions crimped to provide the joints 14 at one corner and it will thus be seen that the housing and cover will provide a strong and durable structure and at the same time provide a guard which will be light in weight. The bottom 15 is hinged to the body as shown at 16 and carries a hasp 17 at its free end which hasp will be swung upwardly to engage the eye 18 when the guard is in place and the bottom moved to a closed position. The rear wall of the housing is provided with a cutout or opening 19 and the forward wall and bottom 15 with cutouts 20 and 21 thus permitting the guard to be put in place about the faucet 22. After the faucet has been shut off or after the faucet has been turned on the desired amount, the guard can be put in place and the lock 23 snapped upon the eye 18 thus securing the guard about the faucet and preventing the faucet from being tampered with by unauthorized persons. This will prevent a faucet from being turned on and left running and will prevent the faucet from being tampered with in case a sprinkler and hose are connected with the faucet and it is not desired to have the faucet turned on beyond a certain amount.

What is claimed is:—

A guard for faucets comprising a housing having top, front, rear and side walls, said front and rear walls having notches in their lower edges adapted to receive the body of a faucet adjacent the inlet and outlet ends thereof, a plate hinged to the lower edge of one side wall and foldable against the other side wall beneath the faucet, said plate having a notch in its front edge registering with the notch in the front wall whereby the notch in the front wall and the notch in the plate embrace the downturned portion of the faucet, and locking means for securing the plate in closed position.

In testimony whereof I affix my signature in presence of two witnesses.

HARRY H. MYERS.

Witnesses:
M. L. LEWIS,
J. C. MYERS.